US012770964B2

(12) United States Patent
Cai et al.

(10) Patent No.: US 12,770,964 B2
(45) Date of Patent: Oct. 20, 2026

(54) END COVER ASSEMBLY, BATTERY CELL, BATTERY, AND ELECTRIC APPARATUS

(71) Applicant: CONTEMPORARY AMPEREX TECHNOLOGY (HONG KONG) LIMITED, Ningde (CN)

(72) Inventors: Rulai Cai, Ningde (CN); Xiaobo Chen, Ningde (CN); Liwen Jiang, Ningde (CN); Fuping Luo, Ningde (CN); Yongshou Lin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 670 days.

(21) Appl. No.: 18/215,850

(22) Filed: Jun. 29, 2023

(65) Prior Publication Data

US 2023/0344047 A1 Oct. 26, 2023

Related U.S. Application Data

(63) Continuation of application No. PCT/CN2022/098445, filed on Jun. 13, 2022.

(30) Foreign Application Priority Data

Jul. 30, 2021 (CN) ......................... 202110876191.8

(51) Int. Cl.
*H01M 50/188* (2021.01)
*H01M 50/15* (2021.01)
(Continued)

(52) U.S. Cl.
CPC ......... *H01M 50/188* (2021.01); *H01M 50/15* (2021.01); *H01M 10/052* (2013.01);
(Continued)

(58) Field of Classification Search
CPC ........... H01M 10/052; H01M 2220/20; H01M 50/15; H01M 50/184; H01M 50/188;
(Continued)

(56) References Cited

U.S. PATENT DOCUMENTS

2013/0196216 A1 8/2013 Hwang
2019/0189998 A1 * 6/2019 Muroya .............. H01M 50/159

FOREIGN PATENT DOCUMENTS

CN 203553234 U 4/2014
CN 102074676 B 4/2016
(Continued)

OTHER PUBLICATIONS

Extended European Search Report issued Jan. 20, 2025 in European Patent Application No. 22848072.9.
(Continued)

*Primary Examiner* — Lingwen R Zeng
(74) *Attorney, Agent, or Firm* — XSENSUS LLP

(57) ABSTRACT

An end cover assembly may include: a cover plate provided with an electrode lead-out hole; an electrode terminal located on one side of the cover plate in a thickness direction and covering the electrode lead-out hole; and a sealing element disposed between the electrode terminal and the cover plate so as to seal the electrode lead-out hole along a circumference of the electrode lead-out hole. The sealing element may include a body and a first insulating element. The first insulating element may be connected to the body and have a higher melting point than the body. The first insulating element may be configured to insulate the electrode terminal from the cover plate after the body is melted, so as to keep electrode terminals of two polarities insulated from each other at thermal runaway of a battery cell.

14 Claims, 8 Drawing Sheets

(51) Int. Cl.

| | |
|---|---|
| *H01M 10/052* | (2010.01) |
| *H01M 50/184* | (2021.01) |
| *H01M 50/191* | (2021.01) |
| *H01M 50/198* | (2021.01) |
| *H01M 50/249* | (2021.01) |
| *H01M 50/586* | (2021.01) |
| *H01M 50/593* | (2021.01) |
| *H01M 50/597* | (2021.01) |

(52) U.S. Cl.
CPC ........ *H01M 50/184* (2021.01); *H01M 50/191* (2021.01); *H01M 50/198* (2021.01); *H01M 50/249* (2021.01); *H01M 50/586* (2021.01); *H01M 50/593* (2021.01); *H01M 50/597* (2021.01); *H01M 2220/20* (2013.01); *Y02E 60/10* (2013.01)

(58) Field of Classification Search
CPC ............. H01M 50/191; H01M 50/198; H01M 50/249; H01M 50/586; H01M 50/593; H01M 50/597; Y02E 60/10
See application file for complete search history.

(56) References Cited

FOREIGN PATENT DOCUMENTS

| | | | |
|---|---|---|---|
| CN | 105576159 | A | 5/2016 |
| CN | 206003849 | U | 3/2017 |
| CN | 208478389 | U | 2/2019 |
| CN | 109817853 | A | 5/2019 |
| CN | 109935889 | A | 6/2019 |
| CN | 110224105 | A | 9/2019 |
| CN | 111373565 | A | 7/2020 |
| CN | 210984767 | U | 7/2020 |
| CN | 111799402 | A | 10/2020 |
| CN | 212366065 | U | 1/2021 |
| EP | 0978888 | A1 | 2/2000 |
| JP | 2014-082073 | A | 5/2014 |
| JP | 2015-072880 | A | 4/2015 |
| WO | 2018/157651 | A1 | 9/2018 |
| WO | 2019/051630 | A1 | 3/2019 |

OTHER PUBLICATIONS

International Search Report and Written Opinion mailed on Aug. 29, 2022, received for PCT Application PCT/CN2022/098445, filed on Jun. 13, 2022, 9 pages including English Translation.

International Search Report issued Aug. 29, 2022 in International Patent Application No. PCT/CN2022/098445 with English translation thereof.

Written Opinion issued Aug. 29, 2022 in International Patent Application No. PCT/CN2022/098445 with English translation thereof.

Notice of First Examination Opinion issued Apr. 7, 2023 in Chinese Patent Application No. 202110876191.8 with English translation thereof.

Zhu Min, "Engineering Materials", General Higher Education "Thirteenth Five-Year" Plan Textbook, Feb. 28, 2018, Metallurgical Industry Press, Beijing with machine English translation thereof.

Notification to Grant Patent Right for Invention issued Jun. 15, 2023 in Chinese Patent Application No. 202110876191.8 with English translation thereof.

Notification of Grant of Invention Patent Right issued May 21, 2026 in Chinese Patent Application No. 202311098986.6 with English translation thereof.

* cited by examiner

END COVER ASSEMBLY, BATTERY CELL, BATTERY, AND ELECTRIC APPARATUS

CROSS-REFERENCE TO RELATED APPLICATIONS

The present application is a continuation of International Application No. PCT/CN2022/098445, filed on Jun. 13, 2022, which claims priority to Chinese Patent Application No. 202110876191.8, filed on Jul. 30, 2021 and entitled "END COVER ASSEMBLY, BATTERY CELL, BATTERY, AND ELECTRIC APPARATUS", each of which is incorporated herein by reference in its entirety.

TECHNICAL FIELD

This application relates to the field of battery manufacturing technologies, and specifically to an end cover assembly, a battery cell, a battery, and an electric apparatus.

BACKGROUND

With the rise of new energy vehicles, the industry of lithium batteries is also developing rapidly. Battery cells are an important part of a new energy vehicle, and therefore their safety performance matters a lot.

In normal use, battery cells are much likely to have thermal runaway as a result of internal short circuit, which in turn easily causes fire, explosion and other safety incidents of the battery cells, seriously threatening the personal safety of users.

SUMMARY

In view of this, this application provides an end cover assembly, a battery cell, a battery, and an electric apparatus, which can keep electrode terminals of two polarities insulated from each other under thermal runaway of a battery cell, thereby improving safety performance of the battery cell.

Embodiments of a first aspect of this application provide an end cover assembly, including: a cover plate provided with an electrode lead-out hole; an electrode terminal located on one side of the cover plate in a thickness direction and covering the electrode lead-out hole; and a sealing element disposed between the electrode terminal and the cover plate so as to seal the electrode lead-out hole along a circumference of the electrode lead-out hole; where the sealing element includes a body and a first insulating element; the first insulating element is connected to the body and has a higher melting point than the body; and the first insulating element is configured to insulate the electrode terminal from the cover plate after the body is melted.

In the end cover assembly according to the embodiments of the first aspect of this application, the sealing element includes a body and a first insulating element, where the first insulating element is connected to the body and has a higher melting point than the body. The sealing element is disposed between the electrode terminal and the cover plate so as to insulate the electrode terminal from the cover plate in the thickness direction of the cover plate. At thermal runaway of a battery cell, ambient temperature rises, the body deforms after melting under a high temperature to expose the first insulating element, and the first insulating element provides support between the electrode terminal and the cover plate to insulate the electrode terminal from the cover plate, ensuring that the electrode terminal is connected to the cover plate in an insulated manner, thus ensuring that electrode terminals of two polarities of the battery cell are insulated from each other, improving safety performance of the battery cell.

In some embodiments of this application, the first insulating element is at least partially embedded into the body.

The first insulating element being at least partially embedded into the body allows the first insulating element to be firmly connected to the body, and can also reduce space occupied by protrusion of the first insulating element from the body, thereby reducing outline dimensions of the sealing element.

In some embodiments of this application, the body is in an annular shape, the first insulating element is provided in plurality, and the plurality of first insulating elements are spaced apart along a circumference of the body.

With the plurality of first insulating elements spaced apart along the circumference of the body, a plurality of first insulating elements can be provided along the circumference of the electrode lead-out hole. After the body is melted, the plurality of first insulating elements jointly support the electrode terminal along the circumference of the electrode lead-out hole, insulating the electrode terminal from the cover plate along the circumference of the electrode lead-out hole, thereby improving reliability of the insulation provided by the first insulating element between the electrode terminal and the cover plate.

In some embodiments of this application, the body and the first insulating element are both annular, and are both disposed around the electrode lead-out hole.

As the first insulating element is annular and disposed around the electrode lead-out hole, after the body is melted, the annular first insulating element uniformly supports the electrode terminal along the circumference of the electrode lead-out hole, insulating the electrode terminal from the cover plate along the circumference of the electrode lead-out hole, thereby improving reliability of the insulation provided by the first insulating element between the electrode terminal and the cover plate.

In some embodiments of this application, the body abuts against the electrode terminal and the cover plate.

As the body abuts against the electrode terminal and the cover plate, the body is compressed between the electrode terminal and the cover plate to seal the electrode lead-out hole circumferentially, thereby preventing electrolyte in a battery cell from leaking through a gap between the electrode terminal and the cover plate.

In some embodiments of this application, the first insulating element is made of ceramic or silicon carbide, and the body is made of rubber.

Made of rubber, the body possesses the good elasticity and insulating property of rubber. Made of ceramic or silicon carbide, the first insulating element possesses the corrosion resistance and insulating property of ceramic or silicon carbide, as well as their high melting point that makes them difficult to melt when heated. Therefore, the first insulating element can stay in its original shape after the body is melted under heating, insulating the electrode terminal from the cover plate.

In some embodiments of this application, the cover plate further includes a flange; the flange surrounds the electrode lead-out hole and protrudes toward the electrode terminal along the thickness direction of the cover plate; and the first insulating element is located on a side of the flange farther away from the electrode lead-out hole.

The flange is configured to assist in positioning of the sealing element so as to prevent the sealing element from deviating from the electrode lead-out hole. With the first insulating element disposed on the side of the flange farther away from the electrode lead-out hole, after the body is melted by heating, the first insulating element provides support between the cover plate and the electrode terminal. The flange can prevent the first insulating element from falling into the battery cell off the edge of the electrode lead-out hole, thus ensuring that the first insulating element can reliably and effectively insulate the electrode terminal from the cover plate after the body is melted by heating.

In some embodiments of this application, a size of the first insulating element in the thickness direction of the cover plate is greater than a protrusion height of the flange.

The size of the first insulating element in the thickness direction of the cover plate being greater than the protrusion height of the flange can ensure that the first insulating element comes against the electrode terminal earlier than the flange after the body is melted by heating so that the electrode terminal is not conductively connected to the cover plate via the flange, thus ensuring effective insulation between the electrode terminal and the cover plate.

In some embodiments of this application, the body includes a first portion, a second portion and a third portion; the first portion is located on a side of the flange closer to the electrode lead-out hole; the second portion is located on a side of the flange farther away from the electrode lead-out hole; the third portion is located on the side of the flange closer to the electrode terminal; the third portion is connected to the first portion and the second portion; and the first insulating element is at least partially embedded into the second portion.

The second portion of the body abuts between the cover plate and the electrode terminal, and the first portion and the third portion jointly cooperate with the flange to define the position of the body, preventing the body from deviating from the electrode lead-out hole to affect the sealing effect at the circumference of the electrode lead-out hole. With the first insulating element at least partially embedded into the second portion, the first insulating element is able to provide support between the cover plate and the electrode terminal after the body is melted by heating, insulating the cover plate from the electrode terminal.

In some embodiments of this application, an insulating layer is formed on a circumferential surface of the electrode terminal, and the insulating layer has a higher melting point than the body.

After the body is melted by heating, the electrode terminal may move with respect to the cover plate along the thickness direction of the cover plate, and the circumferential surface of the electrode terminal may come into contact with a wall of the electrode lead-out hole, causing a conductive connection between the electrode terminal and the cover plate. With the insulating layer formed on the circumferential surface of the electrode terminal and having a higher melting point than the body, contact with the wall of the electrode lead-out hole is made by the insulating layer, thus insulating the cover plate from the electrode terminal.

According to some embodiments of this application, the insulating layer is a rigid anodization layer.

Using a rigid anodization process can form a rigid anodization layer on the surface of the electrode terminal, thereby improving the insulating property of the surface of the electrode terminal, forming an insulating layer with high efficiency and low cost.

In some embodiments of this application, the end cover assembly further includes: a second insulating element surrounding at least part of the circumferential surface of the electrode terminal and connected to the electrode terminal; and a fixing element, fixed to the cover plate and connected to the second insulating element; where the electrode terminal is fixed to the cover plate via the second insulating element and the fixing element; and the electrode terminal is insulated from the fixing element by the second insulating element.

The electrode terminal being fixed to the cover plate via the second insulating element and the fixing element facilitates positioning of the electrode terminal with respect to the cover plate; and the second insulating element being disposed between the electrode terminal and the fixing element makes the electrode terminal insulated from the fixing element, thereby insulating the electrode terminal from the cover plate.

Embodiments of a second aspect of this application provide a battery cell, including a housing with an opening; an electrode assembly, disposed inside the housing; and the end cover assembly provided by the embodiments in the first aspect of this application, where the end cover assembly covers the opening so as to seal the electrode assembly inside the housing.

Embodiments of a third aspect of this application provide a battery including the battery cell according to the embodiments of the second aspect of this application.

Embodiments of a fourth aspect of this application provide an electric apparatus including the battery according to the embodiments of the third aspect of this application.

Additional aspects and advantages of this application will be given in part in the following description, part of which will become apparent from the following description or learned from practices of this application.

BRIEF DESCRIPTION OF DRAWINGS

In order to describe the technical solutions in the embodiments of this application more clearly, the following briefly describes the accompanying drawings required for describing the embodiments. It should be appreciated that the accompanying drawings below show only some embodiments of this application, and thus should not be considered as limitations on the scope. Persons of ordinary skill in the art may still derive other related drawings from the accompanying drawings without creative efforts.

Figure 1:
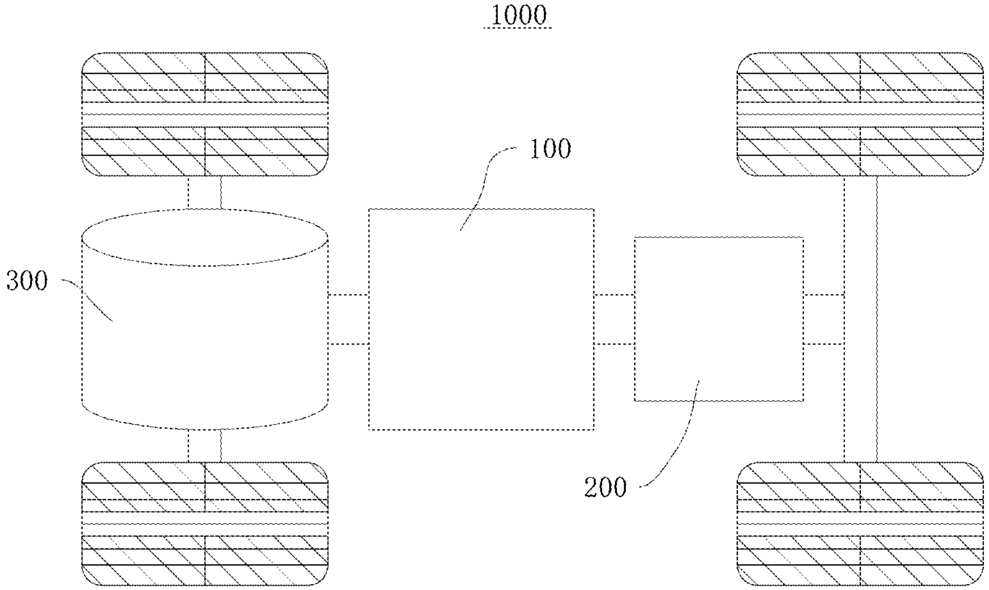
FIG. 1 is simple schematic diagram of a vehicle according to an embodiment of this application.

In the accompanying drawings, the figures are not drawn to scale.

Reference signs: 1000. vehicle; 100. battery; 10. battery cell, 11. end cover assembly; 111. cover plate; 1111. electrode lead-out hole; 1112. first side; 1113. second side; 1114. pressure relief member; 1115. liquid injection hole; 1116. flange; 11161. flange inner side; 11162. flange outer side; 1117. sinking platform structure; 11171. sinking platform surface; 11172. sinking platform hole wall; 112. electrode terminal; 1121. first surface; 1122. second surface; 1123. circumferential surface; 11231. first section; 11232. second section; 11233. third section; 11234. fourth section; 113. sealing element; 1131. body; 11311. first portion; 11312. second portion; 11313. third portion; 1132. first insulating element; 114. second insulating element; 115. fixing element; 12. housing; 13. electrode assembly; 20. box; 21. first box body; 22. second box body; 200. controller; and 300. motor.

DESCRIPTION OF EMBODIMENTS

To make the objectives, technical solutions, and advantages of the embodiments of this application clearer, the following clearly describes the technical solutions in the embodiments of this application with reference to the accompanying drawings of the embodiments of this application. Apparently, the embodiments described are some rather than all embodiments of this application. All other embodiments obtained by persons of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described in the application may be combined with other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. A person of ordinary skills in the art can understand specific meanings of these terms in this application as appropriate to specific situations.

In this application, "a plurality of" means more than two (inclusive).

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The part of positive electrode current collector uncoated with the positive electrode active substance layer protrudes out of the part of positive electrode current collector coated with the positive electrode active substance layer and serves as a positive tab. A lithium-ion battery is used as an example, for which, the positive electrode current collector may be made of aluminum, and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. The part of negative electrode current collector uncoated with the negative electrode active substance layer protrudes out of the part of negative electrode current collector coated with the negative electrode active substance layer and serves as a negative tab. The negative electrode current collector may be made of copper, and the negative electrode active substance may be carbon, silicon, or the like. In order to guarantee that no fusing occurs when a large current passes, a plurality of positive tabs are provided and stacked together, and a plurality of negative tabs are provided and stacked together. The separator may be made of PP (polypropylene, polypropylene), PE (polyethylene, polyethylene), or the like. In addition, the electrode assembly may be a wound structure or a laminated structure, but the embodiments of this application are not limited thereto.

The battery cell may further include a pressure relief member that is actuated when internal pressure of the battery cell reaches a threshold. Threshold design varies according to design requirements. Moreover, the threshold may depend on the material used for one or more of the positive electrode plate, negative electrode plate, electrolyte, and separator in the battery cell. The pressure relief member may take the form of an explosion-proof valve, a gas valve, a pressure relief valve, a safety valve, or the like, and may specifically use a pressure sensitive or temperature sensitive element or structure. To be specific, when internal pressure or temperature of the battery cell reaches the threshold, the pressure relief member is put into an action or a weak structure provided in the pressure relief member is destroyed, thereby forming an opening or channel for relieving the internal pressure or temperature.

"Actuate" mentioned in this application means that the pressure relief member is put into action or is activated to a given state such that the internal pressure and temperature of the battery cell are relieved. The action that the pressure relief member is put into may include but is not limited to, for example, cracking, breakage, tearing, or opening of at least part of the pressure relief member. When the pressure relief member is actuated, high-pressure and high-temperature substances inside the battery cell are discharged from an opening as emissions. In this way, the battery cell can relieve its pressure and temperature under controllable pressure or temperature, thereby avoiding more serious potential incidents.

The battery cell may further include a current collecting member; the current collecting member is configured to electrically connect a tab of the battery cell to the electrode terminal so as to transport electric energy from the electrode assembly to the electrode terminal which then transfers the electric energy to outside the battery cell. A plurality of battery cells are electrically connected via a busbar, so as to implement series, parallel, or series-parallel connection.

In related art, the electrode terminals of two polarities of the battery cell may both be mounted at the cover plate; the electrode terminals are connected to the tabs of the electrode assembly inside the battery cell via current collecting members, and are connected to busbars outside the battery cell, so as to output electric energy from inside the battery cell to outside the battery cell. When the electrode terminals of two polarities are conductively connected, tabs having two polarities of the electrode assembly will be conductively connected, causing short circuit of the battery cell. Generally, an electrode terminal of at least one polarity may be configured to be connected to the cover plate in an insulated manner, so that the electrode terminals of two polarities are insulated from each other.

The inventors have found that the electrode terminal being connected to the cover plate via an element with a low melting point and a good insulating property allows the electrode terminal to be firmly connected to the cover plate and also ensures that the electrode terminal is insulated from the cover plate. In addition, a sealing element is typically disposed between the electrode terminal and the cover plate so as to seal the electrode lead-out hole circumferentially. At thermal runaway of the battery cell, ambient temperature rises rapidly, causing the foregoing element and sealing element to both melt, and as a result, the electrode terminal falls off because of its own gravity or external shaking and possibly will come into contact with the cover plate. When the electrode terminals of two polarities are both in conductive contact with the cover plate, the negative electrode and positive electrode of the battery cell will be conductively connected via the cover plate to cause short circuit, which may result in a safety incident.

Based on the foregoing idea, the inventors provide a technical solution which is able to keep the electrode terminal insulated from the cover plate during thermal runaway of the battery cell. In this way, the electrode terminals of two polarities are insulated from each other, improving safety performance of the battery cell.

It can be understood that the battery cell described in the embodiments of this application may directly supply power to an electric apparatus, or may be connected in series or parallel to form a battery that supplies power to various electric apparatuses.

It can be understood that the electric apparatus which uses a battery cell or battery as described in the embodiments of this application may be in a variety of forms, for example, mobile phones, portable devices, notebook computers, electric bicycles, electric vehicles, ships, spacecrafts, electric toys, and electric tools. For example, the spacecraft includes an airplane, a rocket, a space shuttle, a spaceship, and the like; the electric toy includes a fixed or mobile electric toy, for example, a game console, an electric toy car, an electric toy ship, and an electric toy airplane; and the electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer.

The battery cell and the battery described in the embodiments of this application are applicable to not only the electric apparatuses described above, but also all electric apparatuses using battery cells or batteries. However, for brevity of description, in the following embodiments, an electric vehicle is used as an example for description.

Figure 2:
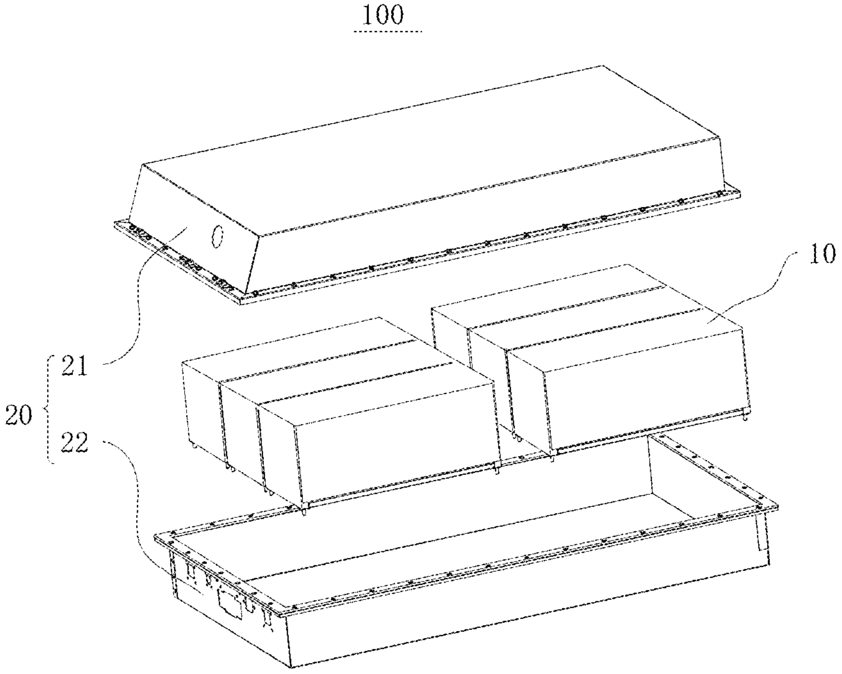
FIG. 2 is a schematic structural diagram of a battery in the vehicle shown in FIG. 1.
Figure 3:
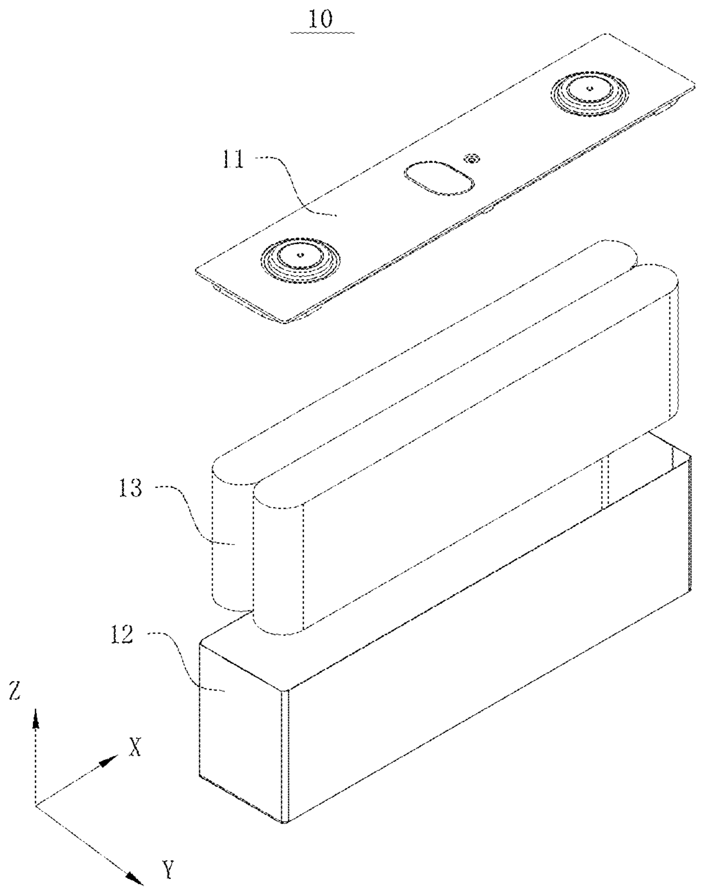
FIG. 3 is a schematic structural diagram of a battery cell of the battery shown in FIG. 2.

FIG. 1 is a simple schematic diagram of a vehicle according to an embodiment of this application, FIG. 2 is a schematic structural diagram of a battery of the vehicle shown in FIG. 1, and FIG. 3 is a schematic structural diagram of a battery cell of the battery shown in FIG. 2.

As shown in FIG. 1, the vehicle 1000 is provided with a battery 100, a controller 200, and a motor 300 inside. For example, the battery 100 may be disposed at the bottom, front, or rear of the vehicle 1000. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like.

In some embodiments of this application, the battery 100 may be configured to supply power to the vehicle 1000. For example, the battery 100 may be used as an operational power source for the vehicle 1000. The controller 200 is configured to control the battery 100 to supply power to the motor 300, for example, to satisfy power needs of start, navigation, and driving of the vehicle 1000.

In other embodiments, the battery 100 can be used not only as the operational power source for the vehicle 1000, but also as a traction power source for the vehicle 1000, replacing or partially replacing fossil fuel or natural gas to provide driving traction for the vehicle 1000.

The battery 100 mentioned in this embodiment of this application is a single physical module that includes one or more battery cells 10 for providing a higher voltage and capacity. For example, the battery 100 is formed by connecting a plurality of battery cells 10 in series or parallel.

As shown in FIG. 2, the battery 100 includes a plurality of battery cells 10 and a box 20. The plurality of battery cells 10 are placed inside the box 20. The box 20 includes a first box body 21 and a second box body 22, where the first box body 21 and the second box body 22 fit with each other to form a battery chamber. The plurality of battery cells 10 are placed inside the battery chamber. Shapes of the first box body 21 and the second box body 22 may be determined depending on the shape of the combination of the plurality of battery cells 10, and the first box body 21 and the second box body 22 may both have an opening. For example, the first box body 21 and the second box body 22 may both be a hollow cuboid with only one side open. The opening of the first box body 21 and the opening of the second box body 22 are arranged opposite to each other, and the first box body 21 and the second box body 22 fit with each other to form a box with a closed chamber. The plurality of battery cells 10 are connected in parallel, in series, or in series-parallel, and then placed into the box formed by the first box body 21 and the second box body 22 fitting together.

As shown in FIG. 3, the battery cell 10 includes an end cover assembly 11, a housing 12, and an electrode assembly 13. The housing 12 has an opening, the electrode assembly 13 is disposed inside the housing 12, and the end cover assembly 11 covers the opening so as to seal the electrode assembly 13 inside the housing 12.

With an opening provided on one end of the housing 12, the electrode assembly 13 can be placed into an accommodating cavity of the housing 12 through the opening. A plurality of electrode assemblies 13 may be provided in the accommodating cavity, the plurality of electrode assemblies 13 being stacked. The housing 12 may be made of a metal material, for example, aluminum, aluminum alloy, or nickel-plated steel. The housing 12 may be a hexahedron or in other shapes, and an accommodating cavity is formed inside the housing to accommodate the electrode assembly 13 and an electrolyte.

The electrode assembly 13 includes a positive electrode plate, a negative electrode plate, and a separator, where the separator is sandwiched between the positive electrode plate and the negative electrode plate to separate the positive electrode plate from the negative electrode plate, so as to prevent short circuit inside the electrode assembly 13.

Figure 4:
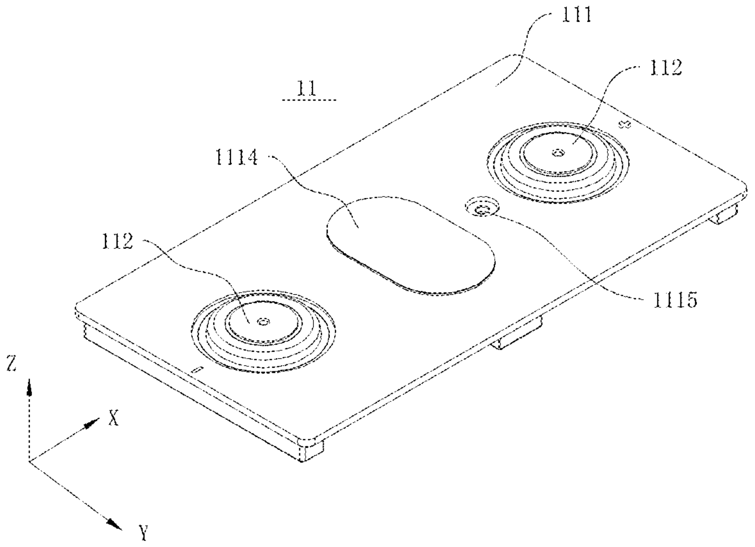
FIG. 4 is a schematic structural diagram of an end cover assembly according to an embodiment of this application.
Figure 5:
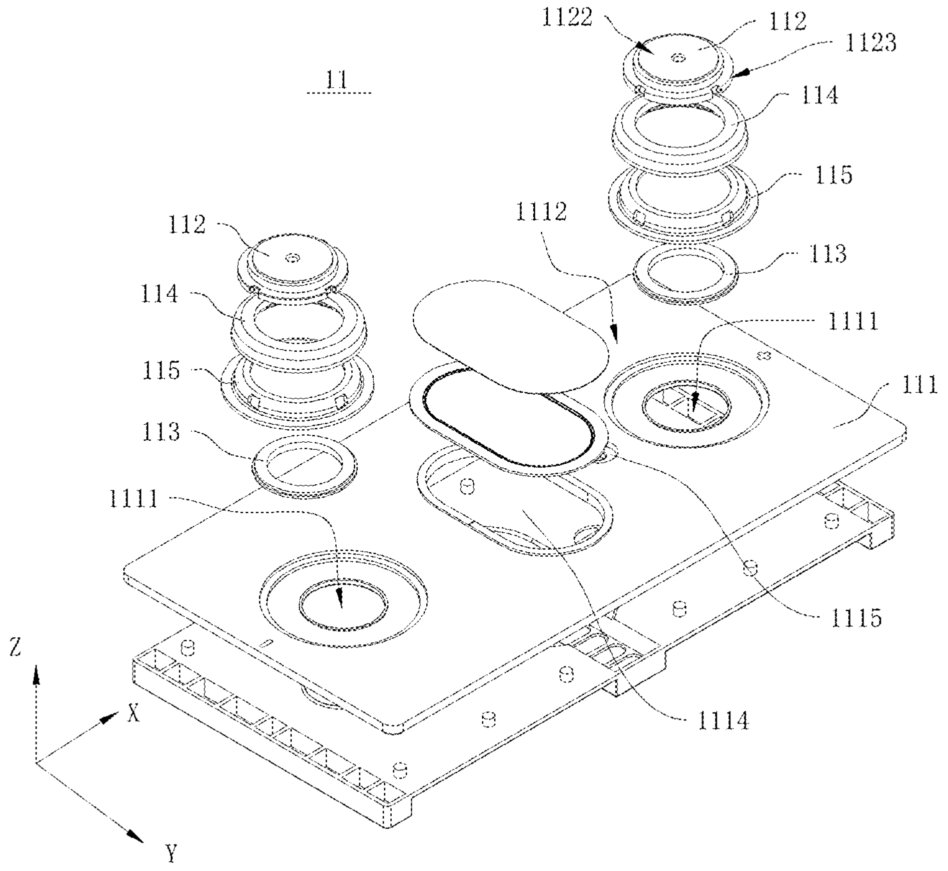
FIG. 5 is an exploded view of an end cover assembly according to an embodiment of this application.

FIG. 4 is a schematic structural diagram of the end cover assembly according to some embodiments of this application; and FIG. 5 is an exploded view of the end cover assembly according to some embodiments of this application.

As shown in FIG. 4 and FIG. 5, the end cover assembly 11 includes a cover plate 111, an electrode terminal 112, and a sealing element 113. The cover plate 111 is provided with an electrode lead-out hole 1111, and the electrode terminal 112 is located on one side of the cover plate 111 in a thickness direction and covers the electrode lead-out hole 1111. The sealing element 113 is disposed between the electrode terminal 112 and the cover plate 111 so as to seal the electrode lead-out hole 1111 along a circumference of the electrode lead-out hole 1111.

In the end cover assembly 11, the cover plate 111 may be rectangular, circular or oval; the electrode lead-out hole 1111 may be a circular hole, a rectangular hole, or a hole in any other shapes; and the number of electrode terminals 112 provided may be one, or two, where the two electrode terminals 112 may have the same or different polarities.

The cover plate 111 is fixed to the opening of the housing 12, so as to seal the electrode assembly 13 and the electrolyte inside the accommodating cavity of the housing 12. The cover plate 111 is made of a metal material, for example, aluminum or steel.

In some embodiments of this application, two electrode lead-out holes 1111 are provided into the cover plate 111 of the battery cell 10. Correspondingly, two electrode terminals 112 and two sealing elements 113 are provided. The electrode lead-out holes 1111, the electrode terminals 112, and the sealing elements 113 are in one-to-one correspondence, each electrode terminal 112 covering a corresponding electrode lead-out hole 1111, and each sealing element 113 is disposed between a corresponding electrode terminal 112 and a corresponding cover plate 111, so as to seal the corresponding electrode lead-out hole 1111 along a circumference of the corresponding electrode lead-out hole 1111. One of the two electrode terminals 112 is a positive electrode terminal and the other one is a negative electrode terminal. The positive electrode terminal is electrically connected to a positive tab of the electrode assembly 13 through a current collecting member, and the negative electrode terminal is electrically connected to a negative tab of the electrode assembly 13 through another current collecting member. In another embodiment, the cover plate 111 is provided with one electrode lead-out hole 1111, and the electrode terminal 112 covers the electrode lead-out hole 1111. Alternatively, the cover plate 111 is provided with two electrode lead-out holes 1111. Correspondingly, two electrode terminals 112 and two sealing elements 113 are provided. The electrode lead-out holes 1111, the electrode terminals 112, and the sealing elements 113 are in one-to-one correspondence. The two electrode terminals 112 have a same polarity, and the two electrode terminals 112 are electrically connected to one tab of the electrode assembly 13 through one current collecting member.

As shown in FIG. 4 and FIG. 5, the cover plate 111 may further include a pressure relief member 1114 and a liquid injection hole 1115. The pressure relief member 1114 is configured to be actuated when internal pressure or temperature of the battery cell 10 reaches a threshold so as to discharge the internal pressure or temperature of the battery cell 10 and guarantee safety of the battery cell 10. The liquid injection hole 1115 is configured for insertion of an external liquid injection device so as to inject electrolyte into the battery cell 10.

In some embodiments of this application, the cover plate 111 is a flat plate, whose length extends along direction X, whose width extends along direction Y, and whose thickness extends along direction Z. The pressure relief member 1114 is centrally disposed at the cover plate 111 and runs through the cover plate 111 in direction Z. The two electrode lead-out holes 1111 are respectively located on two sides of the pressure relief member 1114 in direction X. The liquid injection hole 1115 is close to the pressure relief member 1114.

In other embodiments, depending on the shape of the battery cell 10, the cover plate 111 may take other shapes, for example, being circular or oval. Positions of the electrode lead-out hole 1111, the pressure relief member 1114, and the liquid injection hole 1115 may also be flexibly arranged depending on the specific shape of the cover plate 111.

In some embodiments of this application, the sealing element 113 is an annular ring, an opening of the electrode lead-out hole 1111 is circular, and the electrode terminal 112 is cylindrical.

In other embodiments, the 113 may alternatively be rectangular or oval, flexible sealing element depending on the shape of the opening of the electrode lead-out hole 1111.

Figure 6:
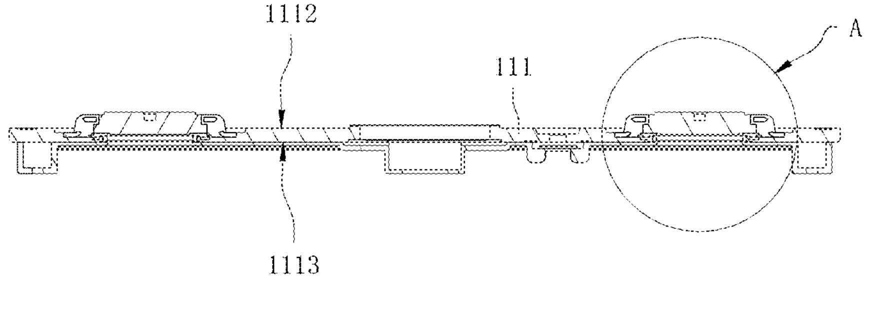
FIG. 6 is a cross-sectional view of an end cover assembly according to an embodiment of this application.
Figure 7:
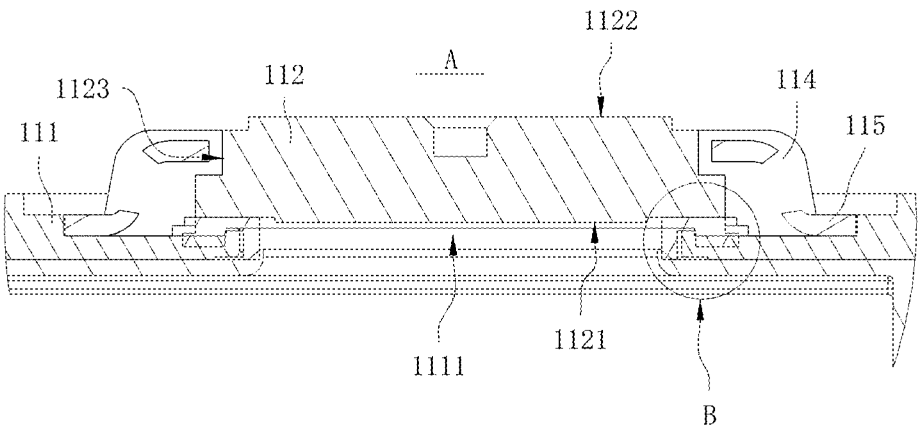
FIG. 7 is a locally enlarged view of position A in FIG. 6.
Figure 8:
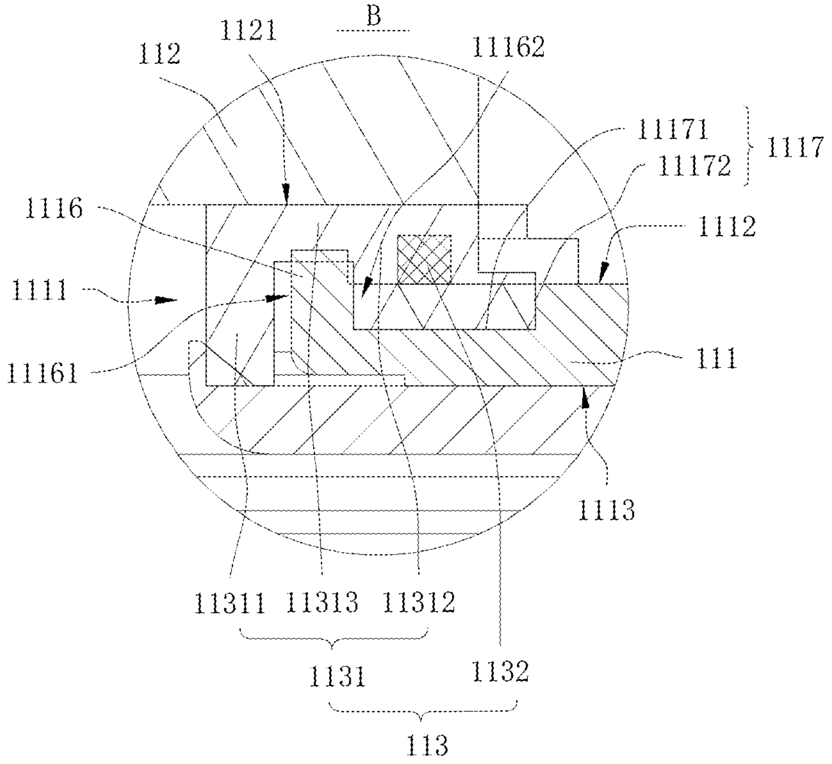
FIG. 8 is a locally enlarged view of position B in FIG. 7.

FIG. 6 is a cross-sectional view of the end cover assembly according to an embodiment of this application; FIG. 7 is a locally enlarged view of position A in FIG. 6; and FIG. 8 is a locally enlarged view of position B in FIG. 7.

As shown in FIG. 6, two sides of the cover plate 111 in direction Z are respectively a first side 1112 and a second side 1113, and the first side 1112 is a side farther away from the housing 12. The electrode terminal 112 is located on the first side 1112 of the cover plate 111 and covers the electrode lead-out hole 1111.

In the end cover assembly 11 of embodiments of this application, the electrode terminal 112 is fixedly connected to the cover plate 111 in an insulated manner.

As shown in FIG. 6 and FIG. 7, the electrode terminal 112 includes a first surface 1121, a second surface 1122, and a circumferential surface 1123. The first surface 1121, the second surface 1122, and the circumferential surface 1123 together form the complete outer surface of the electrode terminal 112. The first surface 1121 and the second surface 1122 are opposite to each other in direction Z. The first surface 1121 is closer to the cover plate 111 and abuts against one side of the sealing element 113, and the second surface 1122 is farther away from the cover plate 111 and is used to connect to a busbar. The circumferential surface 1123 extends along the circumference of the electrode terminal 112 and is connected to the first surface 1121 and the second surface 1122.

As shown in FIG. 7, the end cover assembly 11 further includes a second insulating element 114 and a fixing element 115. The second insulating element 114 surrounds at least part of the circumferential surface 1123 of the electrode terminal 112 and is connected to the electrode terminal 112. The fixing element 115 is fixed to the cover plate 111 and connected to the second insulating element 114. The electrode terminal 112 is fixed to the cover plate 111 via the second insulating element 114 and the fixing element 115; and the electrode terminal 112 is insulated from the fixing element 115 by the second insulating element 114. The electrode terminal 112 being fixed to the cover plate 111 via the second insulating element 114 and the fixing element 115 defines the position of the electrode terminal 112 with respect to the cover plate 111; and the second insulating element 114 being disposed between the electrode terminal 112 and the fixing element 115 insulates the electrode terminal 112 from the fixing element 115, thereby insulating the electrode terminal 112 from the cover plate 111.

In some embodiments of this application, the second insulating element 114 is an annular ring and surrounds the circumferential surface 1123 of the electrode terminal 112 to circumferentially uniformly support the electrode terminal 112.

In other embodiments, the second insulating element 114 may alternatively be a half-ring, or a plurality of second insulating elements 114 are provided, where the plurality of second insulating elements 114 are circumferentially spaced apart, to connect the fixing element 115 to the electrode terminal 112 in an insulated manner.

In some embodiments of this application, the second insulating element 114 is a plastic element, and the fixing element 115 is a metal element. The fixing element 115 is disposed on a sinking platform structure 1117 and is connected to a sinking platform surface 11171 by welding, and the second insulating element 114 circumferentially surrounds the circumferential surface 1123 of the electrode terminal 112 and is connected to the fixing element 115, so as to connect the electrode terminal 112 to the fixing element 115 in an insulated manner.

In other embodiments, the electrode terminal 112 may alternatively be fixedly connected to the cover plate 111 in an insulated manner in other forms.

As shown in FIG. 8, the sealing element 113 of embodiments of this application includes a body 1131 and a first insulating element 1132, and a sealing via hole is formed in the center of the body 1131. The first insulating element 1132 is connected to the body 1131. The first insulating element 1132 has a higher melting point than the body 1131. The first insulating element 1132 is configured to insulate the electrode terminal 112 from the cover plate 111 after the body 1131 is melted.

When thermal runaway occurs in the battery cell 10, ambient temperature of the end cover assembly 11 rises, and the body 1131 and the second insulating element 114 are melted under a high temperature. Due to melting of the second insulating element 114, the cover plate 111 loses connection with the electrode terminal 112, so that the electrode terminal 112 can move freely relative to the cover plate 111, and the electrode terminal 112 comes in contact with the cover plate 111 under gravity and external shaking. The body 1131 melted, the first insulating element 1132 disposed between the electrode terminal 112 and the cover plate 111 can insulate the electrode terminal 112 from the cover plate 111, ensuring that the electrode terminal 112 is connected to the cover plate 111 in an insulated manner, thus ensuring insulation between the electrode terminals 112 having two polarities of the battery cell 10, improving safety performance of the battery cell 10.

In the sealing element 113 of the above solution, the first insulating element 1132 may be at least partially embedded into the body 1131 or entirely exposed outside the body 1131. The body 1131 may abut against the electrode terminal 112 and the cover plate 111 at two sides respectively, or abut against the electrode terminal 112 or the cover plate 111 at one side. The first insulating element 1132 may be one in quantity and have a same shape as the body 1131, or the first insulating element 1132 may be provided in plurality, where the plurality of first insulating elements 1132 are spaced apart along the circumference of the body 1131. Specific embodiments will be described in detail below.

The first insulating element 1132 has a higher melting point than the body 1131, and the first insulating element 1132 is a rigid insulating element to ensure that the body 1131 provides support between the cover plate 111 and the electrode terminal 112 after the body 1131 is melted by heating so as to insulate the cover plate 111 from the electrode terminal 112.

For example, the first insulating element 1132 is made of ceramic or silicon carbide, and the body 1131 is made of rubber. Made of rubber, the body 1131 possesses the good elasticity and insulating property of rubber. Made of ceramic or silicon carbide, the first insulating element 1132 possesses the corrosion resistance and insulating property of ceramic or silicon carbide, as well as their high melting point that makes them difficult to melt when heated. Therefore, the first insulating element 1132 can stay in its original shape after the body 1131 is melted under heating, insulating the electrode terminal 112 from the cover plate 111.

As shown in FIG. 8, in the foregoing solution, the cover plate 111 further includes a flange 1116; the flange 1116 surrounds the electrode lead-out hole 1111 and protrudes toward the electrode terminal 112 along the thickness direction (that is, direction Z) of the cover plate 111; and the first insulating element 1132 is located on a side of the flange 1116 farther away from the electrode lead-out hole 1111.

Specifically, a wall of the electrode lead-out hole 1111 extends from the first side 1112 of the cover plate 111 in direction Z to form the flange 1116. In a radial direction (that is, a direction perpendicular to direction Z) of the electrode lead-out hole 1111, a side of the flange 1116 closer to the electrode lead-out hole 1111 is a flange inner side 11161, and a side farther away from the electrode lead-out hole 1111 is a flange outer side 11162. The flange 1116 is located in a sealing via hole of the sealing element 113, and the first insulating element 1132 is located on the flange outer side 11162, where a projection of the first insulating element 1132 onto the XY plane is located within a projection of the cover plate 111, so as to ensure that the body 1131 can abut against the cover plate 111 after the body 1131 is melted by heating.

The flange 1116 is configured to define the position of the sealing element 113 so as to prevent the sealing element 113 from deviating from the electrode lead-out hole 1111. With the first insulating element 1132 disposed on the flange outer side 11162, after the body 1131 is melted by heating, the first insulating element 1132 provides support between the cover plate 111 and the electrode terminal 112, and the flange 1116 can prevent the first insulating element 1132 from falling into the battery cell 10 off the edge of the electrode lead-out hole 1111, thus ensuring that the first insulating element 1132 can reliably and effectively insulate the electrode terminal 112 from the cover plate 111 after the body 1131 is melted by heating.

In some embodiments of this application, the flange 1116 is a continuous ring to circumferentially uniformly prevent the first insulating element 1132 from falling into the battery cell 10.

In other embodiments, the flange 1116 may alternatively be a plurality of protrusions spaced apart circumferentially, a distance between every two adjacent protrusions being smaller than a minimum external size of the first insulating element 1132, which can also prevent the first insulating element 1132 from falling into the battery cell 10.

In some embodiments of this application, a size of the first insulating element 1132 in the thickness direction (that is, direction Z) of the cover plate 111 is greater than a protrusion height of the flange 1116.

The size of the first insulating element 1132 in the thickness direction of the cover plate 111 being greater than a protrusion height of the flange 1116 can ensure that the first insulating element 1132 comes against the electrode terminal 112 earlier than the flange 1116 after the body 1131 is melted by heating so that the electrode terminal 112 is not conductively connected to the cover plate 111 via the flange 1116, thus ensuring effective insulation between the electrode terminal 112 and the cover plate 111.

For example, in direction Z, the protrusion height of the flange 1116 is 0.5-1 times the size of the first insulating element 1132, and this can effectively prevent the first insulating element 1132 from falling into the battery cell 10, and can also ensure that the first insulating element 1132 comes against the electrode terminal 112 earlier than the flange 1116.

The body 1131 is disposed between the cover plate 111 and the electrode terminal 112 so as to circumferentially seal the electrode lead-out hole 1111.

As shown in FIG. 8, in some embodiments of this application, the body 1131 includes a first portion 11311, a second portion 11312, and a third portion 11313. The first portion 11311 is located on the flange inner side 11161, the second portion 11312 is located on the flange outer side 11162, the third portion 11313 is located on a side of the flange 1116 closer to the electrode terminal 112, and the third portion 11313 connects the first portion 11311 and the second portion 11312. The first insulating element 1132 is at least partially embedded into the second portion 11312.

The second portion 11312 of the body 1131 abuts between the cover plate 111 and the electrode terminal 112, and the first portion 11311 and the third portion 11313 jointly cooperate with the flange 1116 to define the position of the body 1131, thereby preventing the body 1131 from deviating from the electrode lead-out hole 1111 to affect the sealing effect at the circumference of the electrode lead-out hole 1111. With the first insulating element 1132 at least partially embedded into the second portion 11312, the first insulating element 1132 is able to provide support between the cover plate 111 and the electrode terminal 112 after the body 1131 is melted by heating, insulating the cover plate 111 from the electrode terminal 112.

In some other embodiments of this application, the body 1131 may alternatively include only the second portion 11312 and the third portion 11313, or include only the second portion 11312, so as to have a simple structure.

In the foregoing solution, the first insulating element 1132 may be partially or entirely embedded into the second portion 11312 of the body 1131, or entirely exposed outside the second portion 11312 of the body 1131. The body 1131 may abut against the electrode terminal 112 and the cover plate 111 at two sides respectively, or abut against the electrode terminal 112 or the cover plate 111 at one side.

As shown in FIG. 8, in some embodiments of this application, a sinking platform structure 1117 is formed at the edge of a wall of the electrode lead-out hole 1111 to accommodate the electrode terminal 112. The electrode terminal 112 is partly disposed in the sinking platform structure 1117, reducing the size of protrusion of the electrode terminal 112 from the cover plate 111, so as to reduce external dimensions of the battery cell 10, thus indirectly increasing energy density and making it easy to mount and position the electrode terminal 112 so as to facilitate a simplified assembly process.

Specifically, the sinking platform structure 1117 includes a sinking platform surface 11171 and a sinking platform hole wall 11172, and the sinking platform surface 11171 is parallel to the surface of the cover plate 111 and is recessed into the cover plate 111. The sinking platform surface 11171 is configured to abut against the sealing element 113, and the sealing element 113 is disposed between the sinking platform surface 11171 and the first surface 1121 of the electrode terminal 112. The sinking platform hole wall 11172 corresponds to the circumferential surface 1123 of the electrode terminal 112.

In other embodiments, alternatively no sinking platform structure 1117 is provided, and the sealing element 113 abuts against a surface of the cover plate 111 on the first side 1112.

As shown in FIG. 8, in some embodiments of this application, the first insulating element 1132 is entirely embedded into the body 1131, and the first insulating element 1132 is fixedly connected to the body 1131 without increasing the overall size of the body 1131, so that the sealing element 113 has a compact structure. The body 1131 abuts against the electrode terminal 112 and the cover plate 111 at two sides respectively so that the body 1131 is compressed between the electrode terminal 112 and the cover plate 111, thus sealing the electrode lead-out hole 1111 in the circumferentially, preventing the electrolyte in the battery cell 10 from leaking through a gap between the electrode terminal 112 and the cover plate 111.

In the foregoing solution, the first insulating element 1132 may be one in quantity, or the first insulating element 1132 may be provided in plurality, where the plurality of first insulating elements 1132 are spaced apart along the circumference of the body 1131; and the body 1131 may abut against the electrode terminal 112 and the cover plate 111 at two sides respectively, or abut against the electrode terminal 112 or the cover plate 111 at one side.

Figure 9:
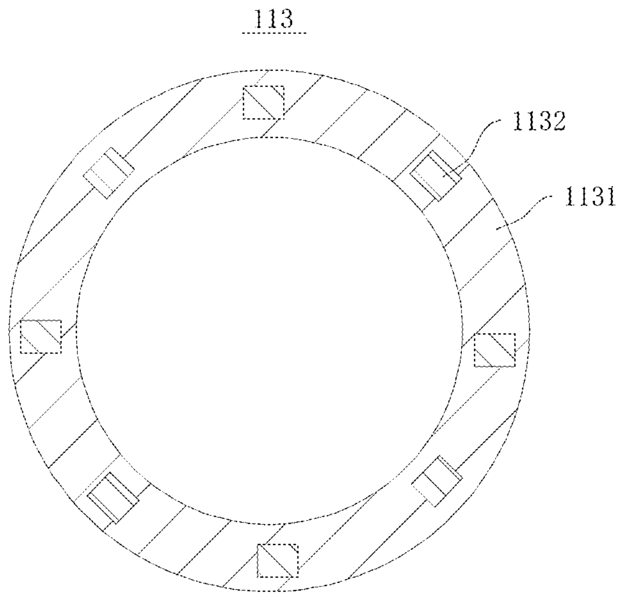
FIG. 9 is a cross-sectional view of a first form of connection between a first insulating element and a body as in a sealing element according to an embodiment of this application.
Figure 10:
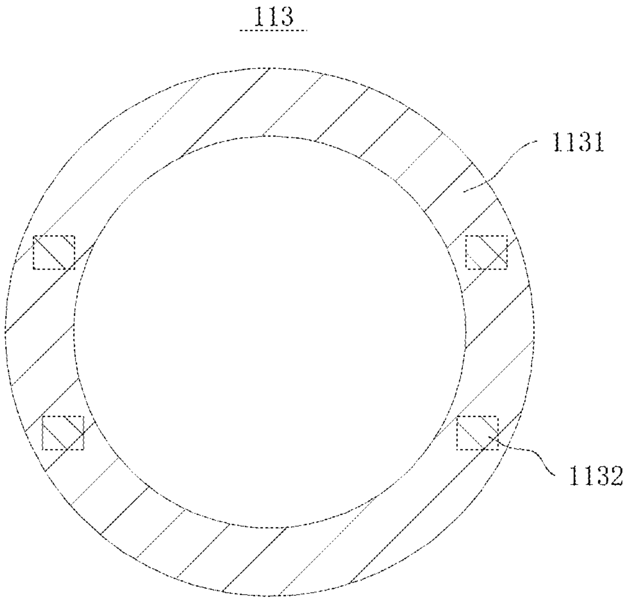
FIG. 10 is a cross-sectional view of a second form of connection between a first insulating element and a body as in a sealing element according to an embodiment of this application.
Figure 11:
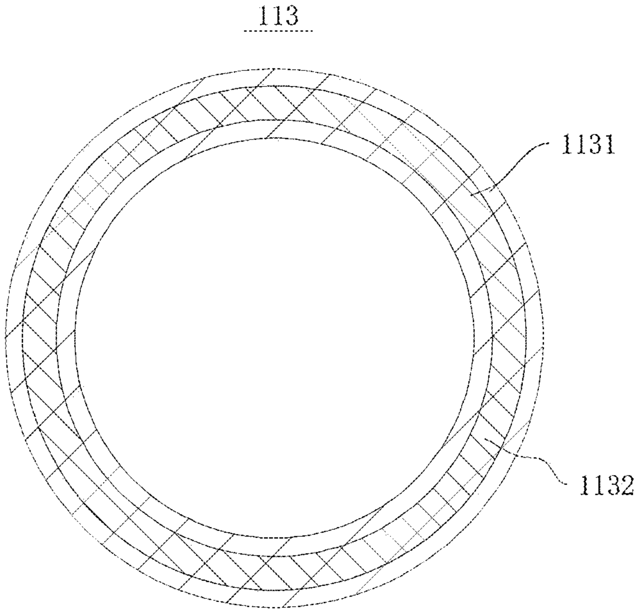
FIG. 11 is a cross-sectional view of a third form of connection between a first insulating element and a body as in a sealing element according to an embodiment of this application.

FIG. 9, FIG. 10, and FIG. 11 are cross-sectional views of several forms of connection between the first insulating element and the body as in the sealing element according to some embodiments of this application.

In some embodiments of this application, the body 1131 is annular, and the first insulating element 1132 is provided in plurality, where the plurality of first insulating elements 1132 are spaced apart along the circumference of the body 1131.

With the plurality of first insulating elements 1132 spaced apart along the circumference of the body 1131, a plurality of first insulating elements 1132 can be provided along the circumference of the electrode lead-out hole 1111. After the body 1131 is melted, the plurality of first insulating elements 1132 jointly support the electrode terminal 112 along the circumference of the electrode lead-out hole 1111, insulating the electrode terminal 112 from the cover plate 111 along the circumference of the electrode lead-out hole 1111, thereby improving reliability of the insulation between the electrode terminal 112 and the cover plate 111.

The plurality of first insulating elements 1132 may be evenly spaced apart along the circumference of the body 1131, or arranged symmetrically with respect to the center of the body 1131.

As shown in FIG. 9, for example, eight first insulating elements 1132 are provided, and the eight first insulating elements 1132 are evenly spaced apart along the axial direction of the body 1131.

As shown in FIG. 10, for another example, four first insulating elements 1132 are provided, where two of the first insulating elements 1132 are located on one radial line of the body 1131, and the other two of the first insulating elements 1132 are located on one radial line of the body 1131.

In the foregoing implementation where a plurality of first insulating elements 1132 are provided, the first insulating element 1132 is in a cuboid, cylinder, or sphere or may be an arc structure. Such shape is simple which facilitates the ease of manufacture and forming.

In other embodiments, one first insulating element 1132 is provided, and the body 1131 and the first insulating element 1132 are both annular, where the body 1131 surrounds the electrode lead-out hole 1111 and the first insulating element 1132 surrounds the electrode lead-out hole 1111.

As shown in FIG. 11, for example, the first insulating element 1132 is entirely embedded into the body 1131 and takes an annular shape. The first insulating element 1132 and the body 1131 may be arranged coaxially or eccentrically, and this is not limited in this embodiment.

As the first insulating element 1132 is annular and surrounds the electrode lead-out hole 1111, after the body 1131 is melted, the annular first insulating element 1132 uniformly supports the electrode terminal 112 along the circumference of the electrode lead-out hole 1111, thus insulating the electrode terminal 112 from the cover plate 111 along the circumference of the electrode lead-out hole 1111, improving reliability of the insulation between the electrode terminal 112 and the cover plate 111.

Figure 12:
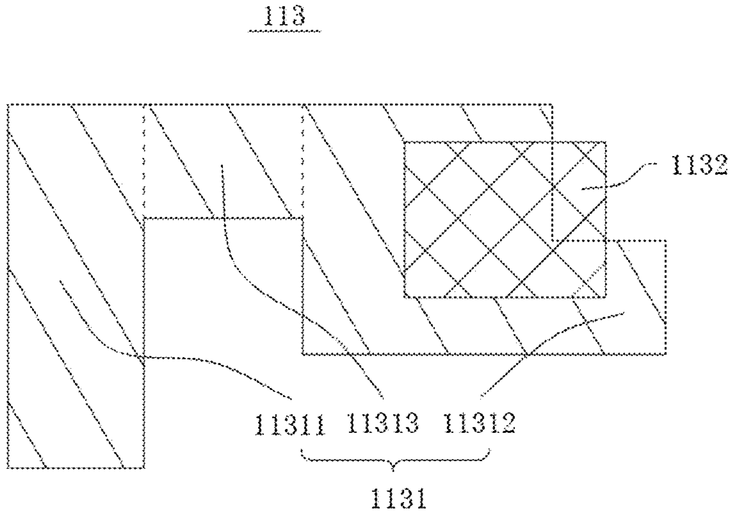
FIG. 12 is a cross-sectional view of a first form of a first insulating element partially protruding from a body as in a sealing element according to an embodiment of this application.
Figure 13:
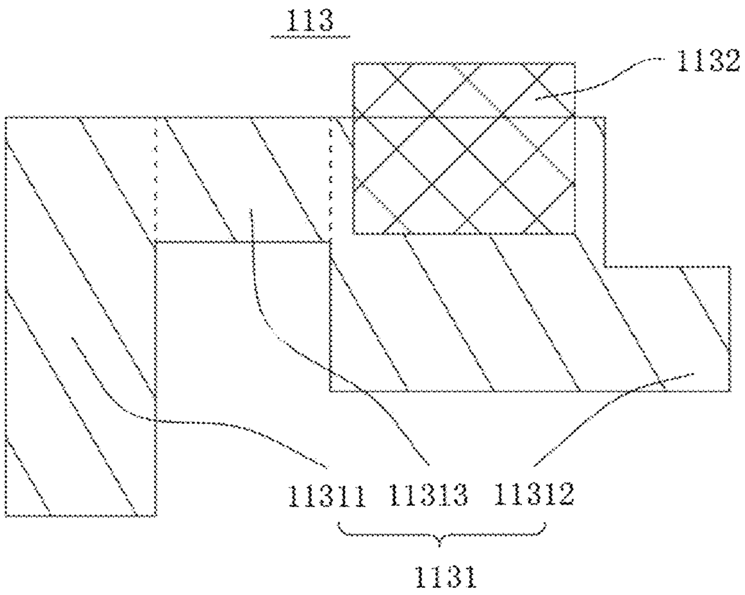
FIG. 13 is a cross-sectional view of a second form of a first insulating element partially protruding from a body as in a sealing element according to an embodiment of this application.
Figure 14:
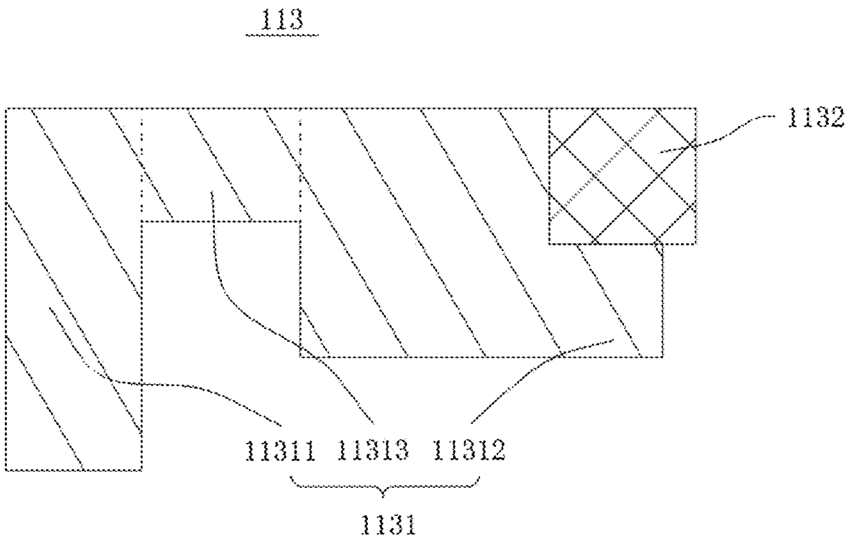
FIG. 14 is a cross-sectional view of a first insulating element entirely protrudes from a body as in a sealing element according to an embodiment of this application.

FIG. 12, FIG. 13, and FIG. 14 are schematic structural diagrams of several other forms of the sealing element according to some other embodiments of this application.

In some other embodiments of this application, the first insulating element 1132 is partially embedded into the body 1131, allowing the first insulating element 1132 to be firmly connected to the body 1131 and reducing space occupied by the protrusion of the first insulating element 1132 from the body 1131, thereby reducing outline dimensions of the sealing element 113.

For example, as shown in FIG. 12, the first insulating element 1132 may protrude from an outer surface of the body 1131 so that the body 1131 abuts against the electrode terminal 112 and the cover plate 111 at two sides respectively. The first insulating element 1132 may protrude from the body 1131 in a direction leaving the sealing via hole, or protrude from the body 1131 in a direction approaching the sealing via hole, or protrude from the body 1131 in both the direction leaving the sealing via hole and the direction approaching the sealing via hole.

For another example, as shown in FIG. 13, the first insulating element 1132 may protrude from an outer surface of the body 1131 so that the body 1131 abuts against the electrode terminal 112 or the cover plate 111 at one side. The first insulating element 1132 may protrude from the body 1131 toward a side of the cover plate 111 closer to the body 1131, or protrude from the body 1131 toward a side of the body 1131 closer to the electrode terminal 112.

In some other embodiments of this application, the first insulating element 1132 is entirely exposed from the outer surface of the body 1131, so that the body 1131 circumferentially uniformly abuts between the cover plate 111 and the electrode terminal 112, improving circumferential tightness of the electrode lead-out hole 1111.

For example, as shown in FIG. 14, the first insulating element 1132 is entirely exposed from the outer surface of the body 1131, the first insulating element 1132 is bonded to the body 1131, and the body 1131 abuts against the electrode terminal 112 and the cover plate 111 at two sides respectively. The first insulating element 1132 may be entirely exposed from a surface of the body 1131 farther away from the sealing via hole, or entirely exposed from a surface of the body 1131 closer to the sealing via hole.

When thermal runaway occurs in the battery cell 10, due to melting of the second insulating element 114, the electrode terminal 112 loses connection with the cover plate 111, and the electrode terminal 112 may fall off under the influence of its own gravity so that the circumferential surface 1123 may come into contact with the sinking platform hole wall 11172 (as shown in FIG. 8), resulting in a conductive connection between the cover plate 111 and the electrode terminal 112.

To insulate the cover plate 111 from the electrode terminal 112, an insulating layer may be provided on the surface of the electrode terminal 112 to further secure the insulation between the cover plate 111 and the electrode terminal 112 at thermal runaway in the battery cell 10.

Figure 15:
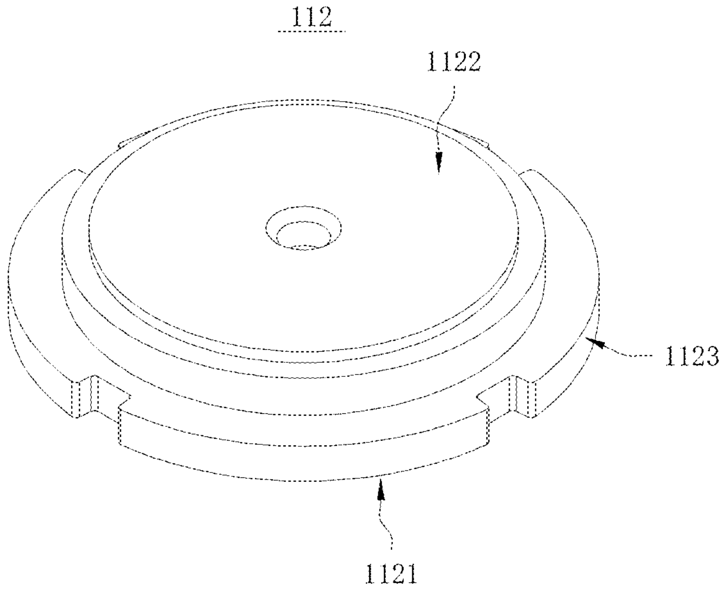
FIG. 15 is a schematic structural diagram of an electrode terminal according to an embodiment of this application.
Figure 16:
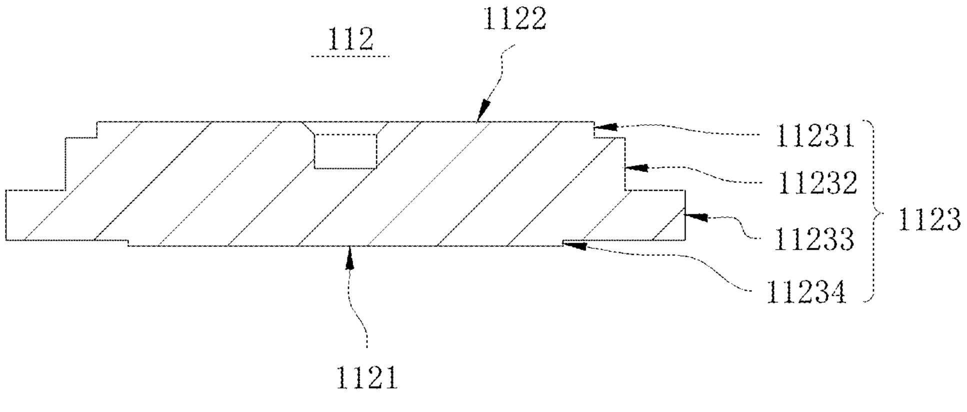
FIG. 16 is a cross-sectional view of an electrode terminal according to an embodiment of this application.

FIG. 15 and FIG. 16 are schematic structural diagrams of an electrode terminal according to some embodiments of this application.

As shown in FIG. 15 and FIG. 16, the electrode terminal 112 includes a first surface 1121, a second surface 1122, and a circumferential surface 1123. The first surface 1121, the second surface 1122, and the circumferential surface 1123 together form the complete outer surface of the electrode terminal 112. The circumferential surface 1123 extends along the circumference of the electrode terminal 112 and is connected to the first surface 1121 and the second surface 1122.

In the description of this application, the circumferential surface 1123 is a contoured surface along the circumference of the electrode terminal, and in the presence of a step at the circumference of the electrode terminal 112 in direction Z, the circumferential surface 1123 is a continuous surface. For example, the circumferential surface 1123 includes a first section 11231, a second section 11232, a third section 11233, and a fourth section 11234 that transition sequentially, where the first section 11231 is connected to the second surface 1122, and the fourth section 11234 is connected to the first surface 1121.

In some embodiments of this application, an insulating layer is formed on the circumferential surface 1123 of the electrode terminal 112, and the insulating layer has a higher melting point than the body 1131.

After the body 1131 is melted by heating, the electrode terminal 112 may move with respect to the cover plate 111 along the thickness direction (that is, on the XY plane) of the cover plate 111, and the circumferential surface 1123 of the electrode terminal 112 may come into contact with the sinking platform hole wall 11172 (as shown in FIG. 8) of the electrode lead-out hole 1111, causing a conductive connection between the electrode terminal 112 and the cover plate 111. With the insulating layer formed on the circumferential surface 1123 of the electrode terminal 112 and having a higher melting point than the body 1131, contact with the sinking platform hole wall 11172 of the electrode lead-out hole 1111 is made by the insulating layer, thus insulating the cover plate 111 from the electrode terminal 112.

In other embodiments, an insulating layer may alternatively be provided on the sinking platform hole wall 11172 (as shown in FIG. 8) to insulate the cover plate 111 from the electrode terminal 112.

The insulating layer may be formed on the surface of the electrode terminal 112 in various forms.

In some embodiments of this application, the insulating layer is a rigid anodization layer. Using a rigid anodization process can form a rigid anodization layer on the surface of the electrode terminal 112, thereby improving the insulating property of the surface of the electrode terminal 112, forming an insulating layer with high efficiency and low cost. For example, the entire outer surface of the electrode terminal 112 may be oxidized to form an insulating layer which is then milled to produce the first surface 1121 and the second surface 1122 such that the first surface 1121 and the second surface 1122 are conductive surfaces.

In other embodiments, an insulating layer may alternatively be formed on the surface of the electrode terminal 112 via processes such as film sticking and spraying.

It should be noted that, without conflicts, the features in the embodiments of this application may be combined with each other.

The foregoing descriptions are merely preferred embodiments of this application which are not intended to limit this application. Persons skilled in the art can make various modifications and variations to this application. Any modifications, equivalent replacements, and improvements made without departing from the spirit and principle of this application shall fall within the protection scope of this application.

The invention claimed is:

1. An end cover assembly, comprising:

a cover plate, provided with an electrode lead-out hole;

an electrode terminal, located on one side of the cover plate in a thickness direction and covering the electrode lead-out hole; and a sealing element, disposed between the electrode terminal and the cover plate so as to seal the electrode lead-out hole along a circumference of the electrode lead-out hole, wherein the sealing element comprises a body and a first insulating element; the first insulating element is connected to the body and has a higher melting point than the body; and the first insulating element is configured to insulate the electrode terminal from the cover plate after the body is melted, wherein the cover plate further comprises a flange; the flange surrounds the electrode lead-out hole and protrudes toward the electrode terminal in the thickness direction of the cover plate; and the first insulating element is located only on a side of the flange farther away from the electrode lead-out hole in a radial direction of the electrode lead-out hole.

2. The end cover assembly according to claim 1, wherein the first insulating element is at least partially embedded into the body.

3. The end cover assembly according to claim 1, wherein the body is in an annular shape, the first insulating element is provided in plurality, and the plurality of first insulating elements are spaced apart along a circumference of the body.

4. The end cover assembly according to claim 1, wherein the body and the first insulating element are both annular and are both disposed around the electrode lead-out hole.

5. The end cover assembly according to claim 1, wherein the body abuts against the electrode terminal and the cover plate.

6. The end cover assembly according to claim 1, wherein the first insulating element is made of ceramic or silicon carbide, and the body is made of rubber.

7. The end cover assembly according to claim 1, wherein a size of the first insulating element in the thickness direction of the cover plate is greater than a protrusion height of the flange.

8. The end cover assembly according to claim 1, wherein the body comprises a first portion, a second portion and a third portion; the first portion is located on a side of the flange closer to the electrode lead-out hole; the second portion is located on a side of the flange farther away from the electrode lead-out hole; the third portion is located on a side of the flange closer to the electrode terminal; the third portion is connected to the first portion and the second portion; and the first insulating element is at least partially embedded into the second portion.

9. The end cover assembly according to claim 1, wherein an insulating layer is formed on a circumferential surface of the electrode terminal, and the insulating layer has a higher melting point than the body.

10. The end cover assembly according to claim 9, wherein the insulating layer is a rigid anodization layer.

11. The end cover assembly according to claim 1, wherein the end cover assembly further comprises:

a second insulating element, surrounding at least part of the circumferential surface of the electrode terminal and connected to the electrode terminal; and a fixing element, fixed to the cover plate and connected to the second insulating element; wherein the electrode terminal is fixed to the cover plate via the second insulating element and the fixing element; and the electrode terminal is insulated from the fixing element by the second insulating element.

12. A battery cell, comprising:

a housing with an opening;

an electrode assembly, disposed inside the housing; and the end cover assembly according to claim 1, wherein the end cover assembly covers the opening, so as to seal the electrode assembly inside the housing.

13. A battery, comprising the battery cell according to claim 12.

14. An electric apparatus, comprising the battery according to claim 13.

* * * * *